United States Patent [19]

Welsch

[11] Patent Number: 5,563,774

[45] Date of Patent: Oct. 8, 1996

[54] LAWNMOWER HEADLIGHT SYSTEM

[76] Inventor: Richard A. Welsch, 7239 Dungan Rd., Philadelphia, Pa. 19111

[21] Appl. No.: 529,208

[22] Filed: Sep. 15, 1995

[51] Int. Cl.⁶ .................................................. B60Q 1/04
[52] U.S. Cl. ...................... 362/80; 362/83.3; 362/253; 180/19.1
[58] Field of Search ..................... 362/61, 80, 83.3, 362/253, 89; 180/19.1, 53.8

[56] References Cited

U.S. PATENT DOCUMENTS 2,082,764  6/1937  Hosier ........................................ 362/89
2,480,944  9/1949  Malpass ................................... 180/19.1
2,592,856  4/1952  Brockman ............................... 180/19.1
4,915,068  4/1990  Tharman ............................... 139/149 D Primary Examiner—Denise L. Gromada
Assistant Examiner—Y. Quach

[57] ABSTRACT

A system for illuminating an area in front of a lawnmower. The inventive device includes a generator coupled to an engine of the mower for generating electrical power. An illumination assembly is secured to an engine of the mower. A control switch is mounted to the handle of the mower for operation by an individual to effect energization of the illumination assembly to permit mowing during poor ambient light conditions.

4 Claims, 4 Drawing Sheets

5,563,774

LAWNMOWER HEADLIGHT SYSTEM

BACKGROUND OF THE INVENTION

1. Field of the Invention

The present invention relates to vehicle illumination devices and more particularly pertains to a lawnmower headlight system for illuminating an area in front of a lawnmower.

2. Description of the Prior Art

The use of vehicle illumination devices is known in the prior art. More specifically, vehicle illumination devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art vehicle illumination devices include U.S. Pat. No. 3,898,451; U.S. Pat. No. 3,973,114; U.S. Pat. No. 5,313,135; U.S. Design Patent 307,911; U.S. Design Patent 249,266; and U.S. Design Patent 274,250.

While these devices fulfill their respective, particular objectives and requirements, the aforementioned patents do not disclose a lawnmower headlight system for illuminating an area in front of a lawnmower which includes a generator coupled to an engine of the mower for generating electrical power, an illumination assembly secured to an engine of the mower, and a control switch mounted to the handle of the mower for operation by an individual to effect energization of the illumination assembly to permit mowing during poor ambient light conditions.

In these respects, the lawnmower headlight-system according to the present invention substantially departs from the conventional concepts and designs of the prior art, and in so doing provides an apparatus primarily developed for the purpose of illuminating an area in front of a lawnmower.

SUMMARY OF THE INVENTION

In view of the foregoing disadvantages inherent in the known types of vehicle illumination devices now present in the prior art, the present invention provides a new lawnmower headlight system construction wherein the same can be utilized for illuminating an area in front of a lawnmower. As such, the general purpose of the present invention, which will be described subsequently in greater detail, is to provide a new lawnmower headlight system apparatus and method which has many of the advantages of the vehicle illumination devices mentioned heretofore and many novel features that result in a lawnmower headlight system which is not anticipated, rendered obvious, suggested, or even implied by any of the prior art vehicle illumination devices, either alone or in any combination thereof.

To attain this, the present invention generally comprises a system for illuminating an area in front of a lawnmower. The inventive device includes a generator coupled to an engine of the mower for generating electrical power. An illumination assembly is secured to an engine of the mower. A control switch is mounted to the handle of the mower for operation by an individual to effect energization of the illumination assembly to permit mowing during poor ambient light conditions.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements .of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new lawnmower headlight system apparatus and method which has many of the advantages of the vehicle illumination devices mentioned heretofore and many novel features that result in a lawnmower headlight system which is not anticipated, rendered obvious, suggested, or even implied by any of the prior art vehicle illumination devices, either alone or in any combination thereof.

It is another object of the present invention to provide a new lawnmower headlight system which may be easily and efficiently manufactured and marketed.

It is a further object of the present invention to provide a new lawnmower headlight system which is of a durable and reliable construction.

An even further object of the present invention is to provide a new lawnmower headlight system which is susceptible of a low cost of manufacture with regard to both materials and labor, and which accordingly is then susceptible of low prices of sale to the consuming public, thereby making such lawnmower headlight systems economically available to the buying public.

Still yet another object of the present invention is to provide a new lawnmower headlight system which provides in the apparatuses and methods of the prior art some of the advantages thereof, while simultaneously overcoming some of the disadvantages normally associated therewith.

Still another object of the present invention is to provide a new lawnmower headlight system for illuminating an area in front of a lawnmower.

Yet another object of the present invention is to provide a new lawnmower headlight system which includes a generator coupled to an engine of the mower for generating electrical power, an illumination assembly secured to an engine of the mower, and a control switch mounted to the handle of the mower for operation by an individual to effect energization of the illumination assembly to permit mowing during poor ambient light conditions.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figures 1, 2:
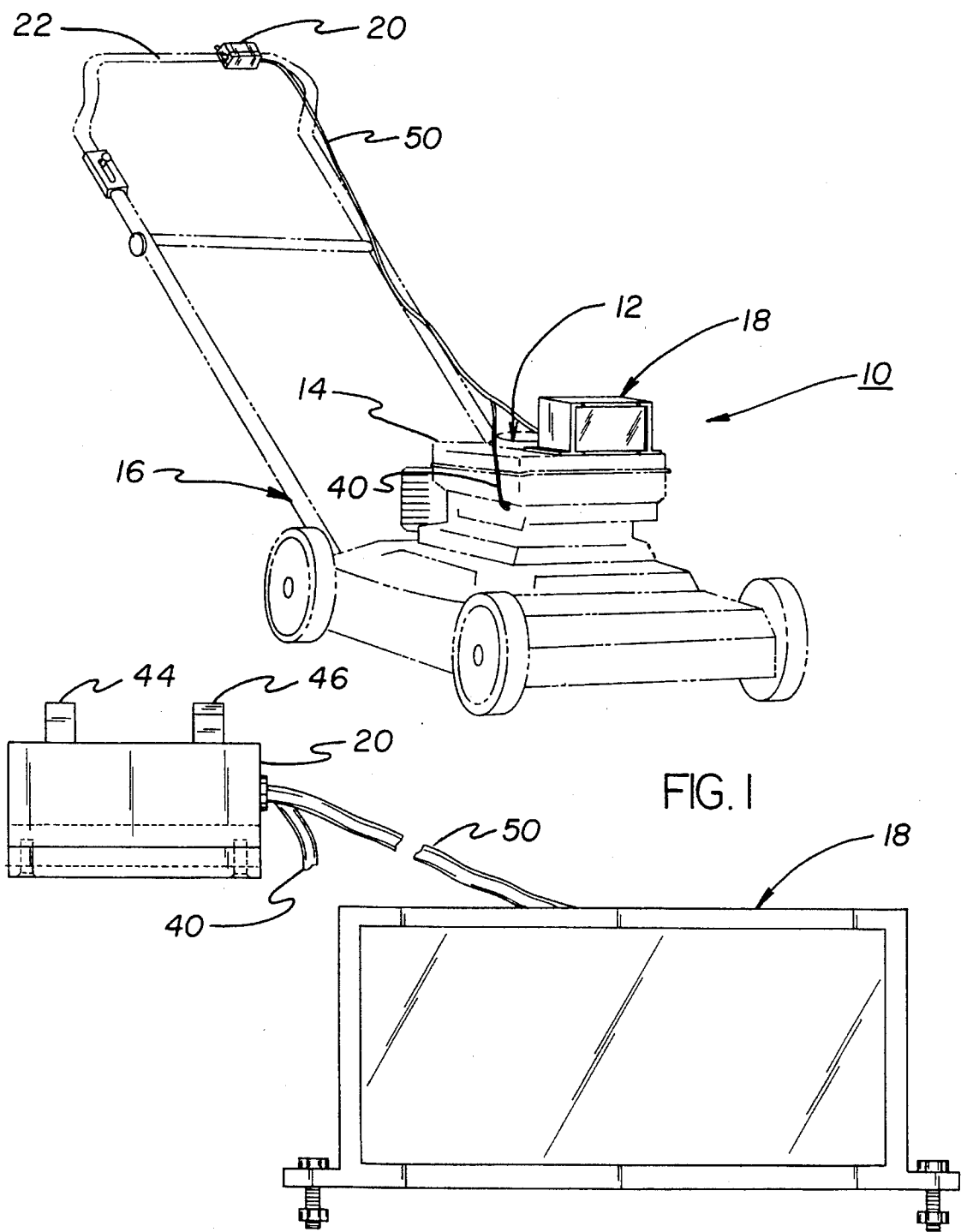
FIG. 1 is an isometric illustration of a lawnmower headlight system according to the present invention in use.
FIG. 2 is an elevation view of the invention.
Figure 3:
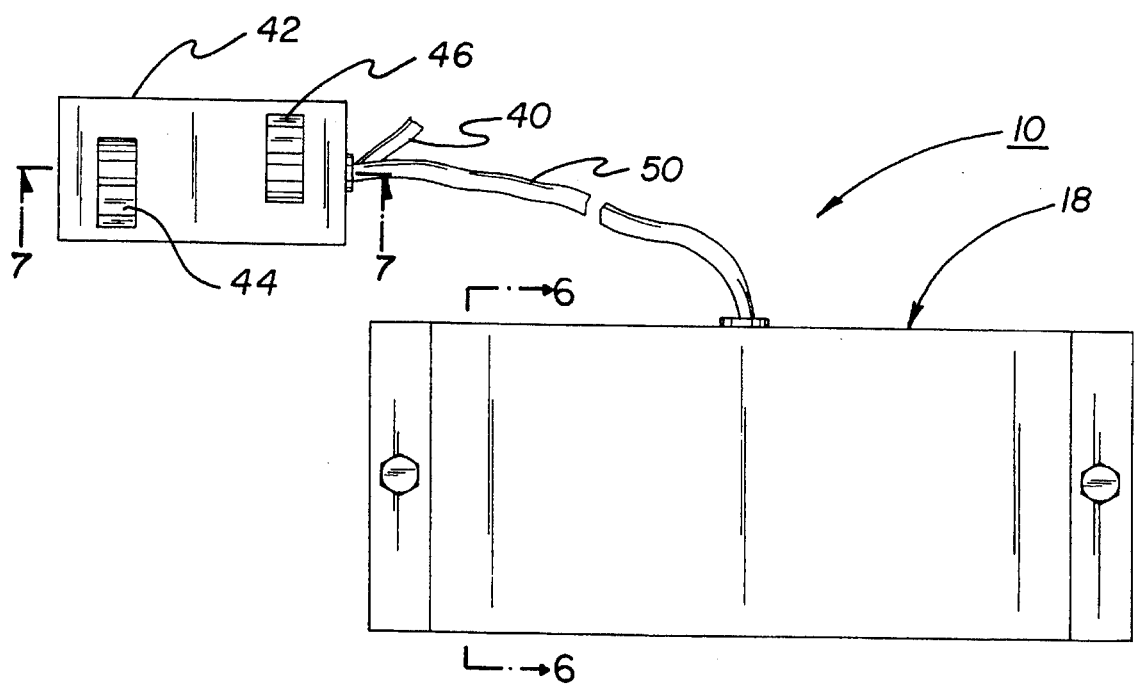
FIG. 3 is a top plan view thereof.

With reference now to the drawings, and in particular to FIGS. 1–8 thereof, a new lawnmower headlight system embodying the principles and concepts of the present invention and generally designated by the reference numeral 10 will be described.

More specifically, it will be noted that the lawnmower headlight system 10 comprises a generator means 12 (see FIG. 8) mechanically coupled to or forming a portion of an engine 14 of a lawnmower 16 for generating electrical power in response to an operation of the engine. An illumination means 18 is mountable to the engine 14 of the lawnmower 16 and is electrically coupled to the generator means 12 for providing illumination directed forwardly of the lawnmower 12. A control switch 20 is positioned in electrical communication with the illumination means 18 and is mounted to a handle 22 of the lawnmower 16 for controlling both an energization of the illumination means 18 and a dimming control thereof, as shown in FIG. 1 of the drawings.

Figure 8:
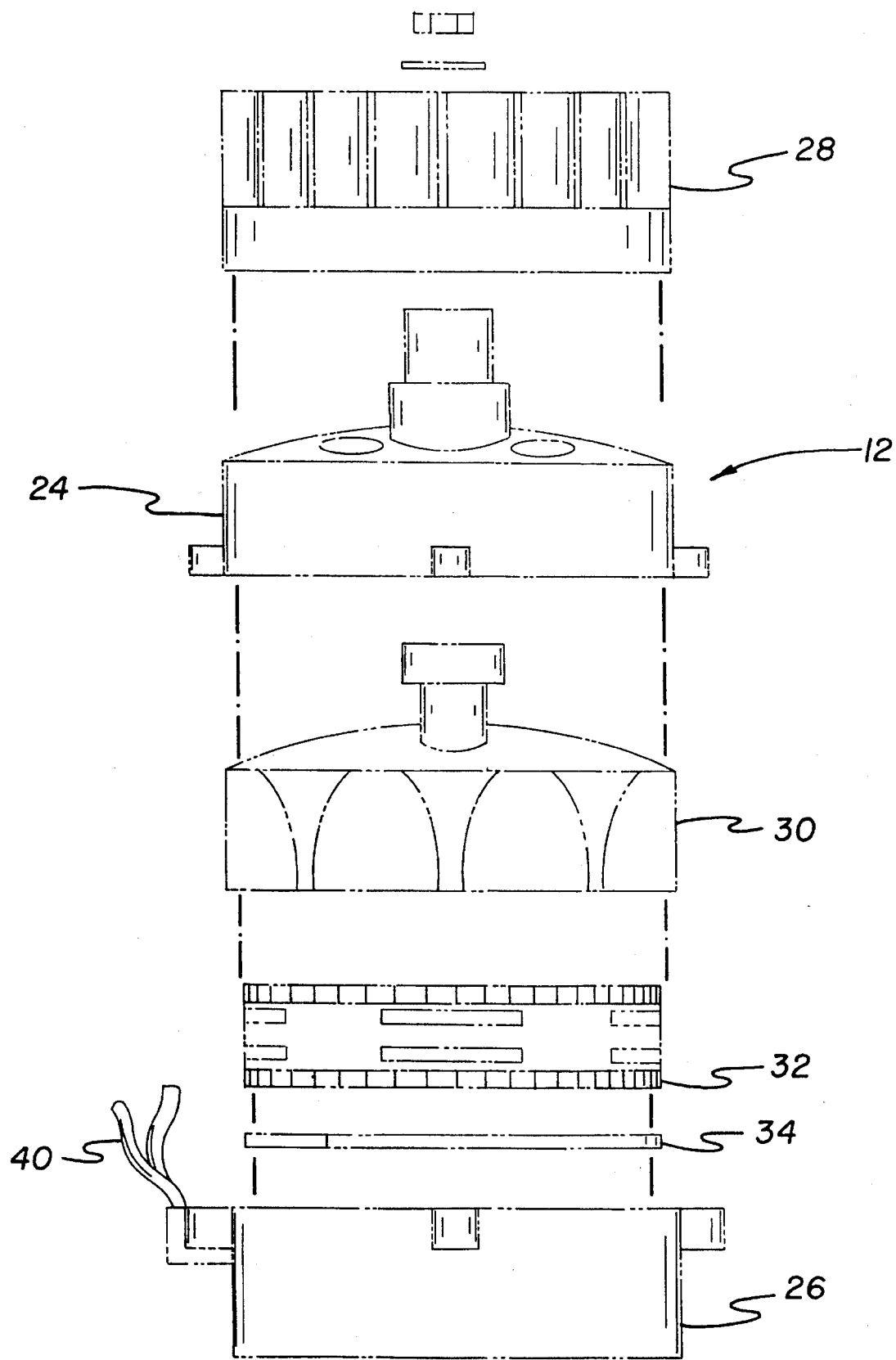
FIG. 8 is an exploded elevational view of a generator means of the invention.

Referring now to FIG. 8, it can be shown that the generator means 12 of the present invention 10 preferably comprises an upper housing member 24 and a lower housing member 26. An unillustrated output shaft of the engine 14 projects through apertures in the housing members to couple with a flywheel 28 so as to rotatably mount the flywheel above the upper housing member 24. The flywheel 28 may include unlabeled fins, as shown in FIG. 8, projecting therefrom which operate to cause a flow of cooling air over the engine. A rotor 30 is mounted to the engine shaft of the engine and rotates within and between the housing members 24 and 26. A stator 32 is mounted within the housing members 24 and 26 and positioned within or adjacent to the rotor. The stator 32 is electrically coupled to a power cable 40 extending from the generator means and is separated from the interior surface of the lower housing 26 by an insulator 34 interposed therebetween. The rotor 30 includes permanent magnets or the like such that a rotation of the rotor by the engine shaft attached thereto will generate an induced current in the stator 32, thereby generating power for use by the illumination means 18. By this structure, rotational torque from the engine shaft of the engine 14 is converted into electrical power dispensed through a plurality of conductors in the power cable 40 extending into electrical communication with the control switch 20.

Figure 7:
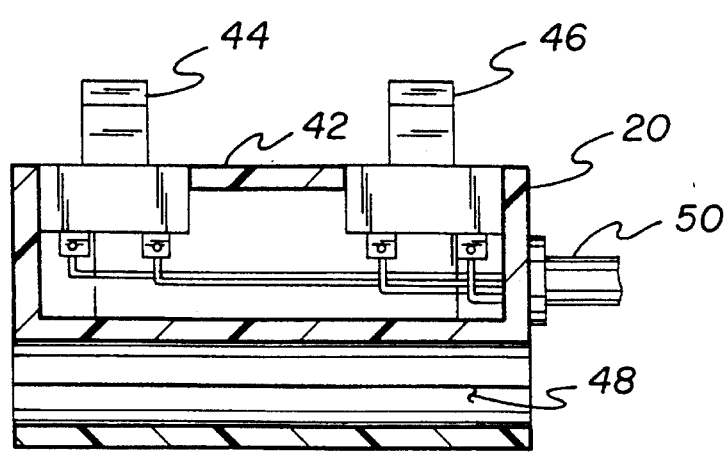
FIG. 7 is a cross-sectional view taken along line 7—7 of FIG. 4.

As best illustrated in FIG. 7, it can be shown that the control switch 20 of the present invention 10 preferably comprises a switch housing 42 having a power switch 44 and a dimmer switch 46 mounted relative thereto. The switch housing 42 is shaped so as to define a handle bore 48 directed therethrough which receives a portion of the handle 22 of the lawnmower 16 so as to mount the control switch 20 in a readily accessible position as shown in FIG. 1 of the drawings. The power switch 44 and the dimmer switch 46 are electrically coupled to the power cable 40 and to a control cable 50, with the control cable extending into electrical communication with the illumination means 18. By this structure, selective operation and control of the illumination means 18 can be remotely effected by an individual pushing the lawnmower 16 from behind the handle 22 as shown in FIG. 1 of the drawings.

Figure 4:
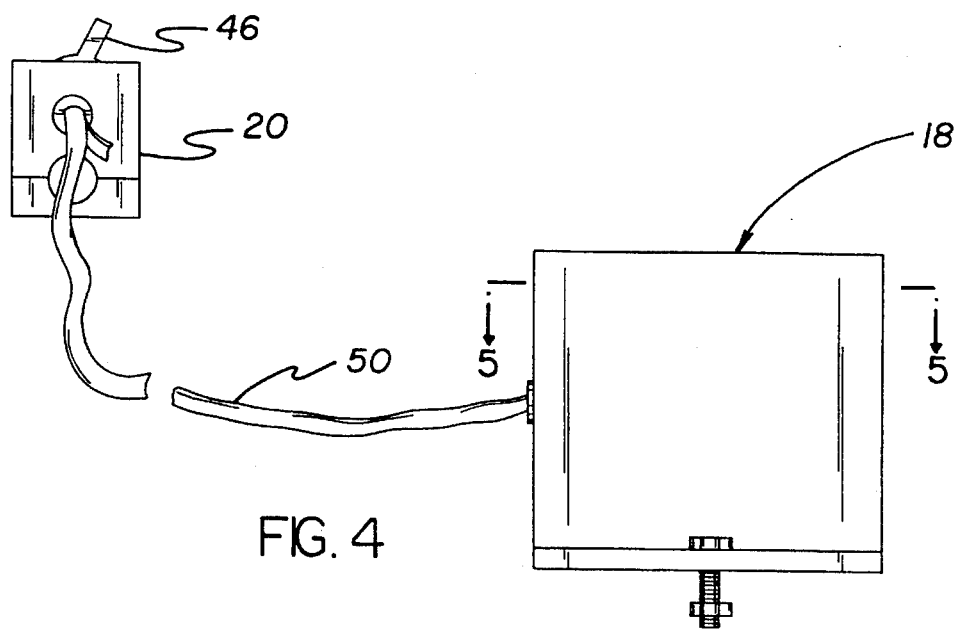
FIG. 4 is a side elevation view of a portion of the present invention.
Figure 5:
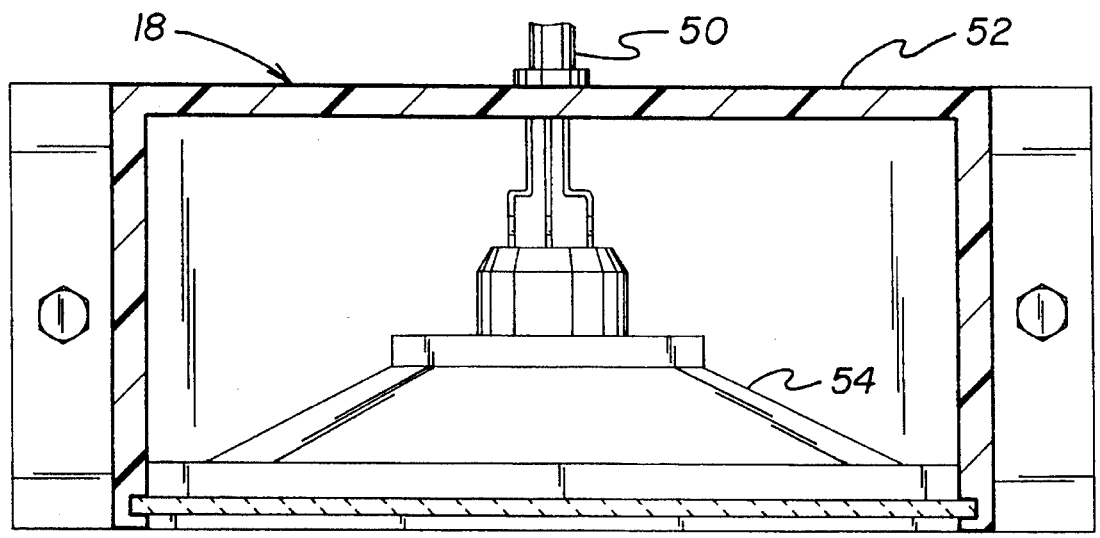
FIG. 5 is a cross-sectional view taken along line 5—5 of FIG. 4.
Figure 6:
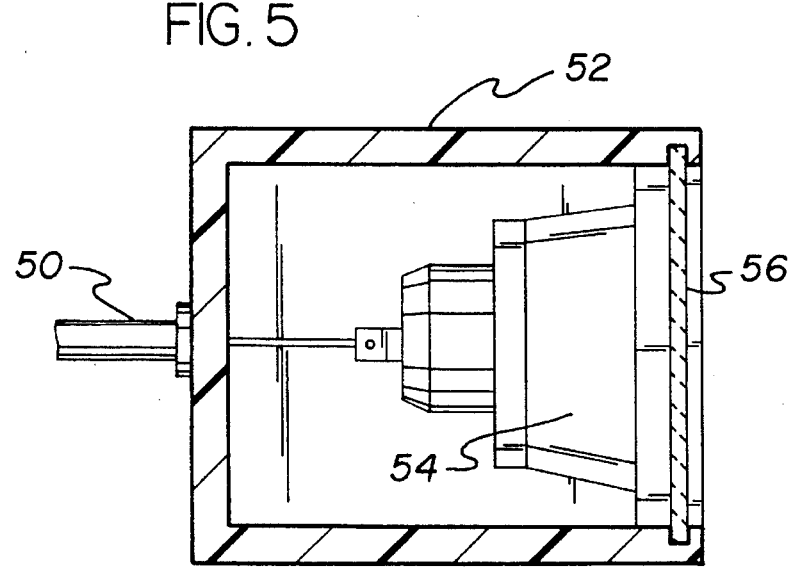
FIG. 6 is a cross-sectional view taken along line 6—6 of FIG. 3.

Referring now to FIGS. 4 through 6, it can be shown that the illumination means 18 of the present invention 10 preferably comprises a light housing 52 mounted to the engine 14 of the lawnmower 16. The control cable 50 extends through the light housing 52 from the control switch 20 and is electrically coupled to a dual-beam headlight 54 mounted within the light housing 52 and behind a front lens 56. The dual-beam headlight 54 is of a conventionally known automobile-type which includes both high and low beams. Thus, the dimmer switch 46 operates to control a distribution of electrical power to the dual-beam headlight 54 so as to effect selective operation of either a high or low beam thereof.

In use, the lawnmower headlight system 10 of the present invention can be easily incorporated into a lawnmower 16 as shown in FIG. 1 of the drawings. The illumination means 18, when energized by the generator means 12 through manual controlling of the control switch 20, illuminates an area in front of the lawnmower 16 to allow an individual to mow a lawn during poor ambient light conditions such as during nighttime or the like.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A lawnmower headlight system comprising:

a generator means mechanically coupled to the shaft of an engine of a lawnmower for generating electrical power in response to the rotation of the shaft of said engine, said generator means comprising an upper housing member and a lower housing member, the housing members including apertures directed therethrough permitting a projection of an engine shaft of such engine through the housing members; a rotor mounted to the engine shaft of the engine and rotatable within and between the housing members; and a stator mounted within the housing members and positioned adjacent said rotor, the stator being positioned in electrical communication with an illumination means by a power cable extending from the generator means to the illumination means, though a control switch the rotor containing permanent magnets such that a rotation of the rotor will generate an induced current in the stator thereby generating power for use by the illumination means mounted to the engine of the lawnmower for providing illumination directed forwardly of the lawnmower;

and said control switch positioned in electrical communication with said illumination means and mountable to a handle of the lawnmower for controlling both an energization of the illumination means and a dimming control thereof; wherein the control switch comprises a switch housing having a power switch and a dimmer switch mounted thereto, the switch housing being shaped to define a handle bore directed therethrough to receive a portion of the handle of the lawnmower so as to mount the control switch thereto, the power switch and the dimmer switch being electrically coupled to the power cable; and further comprising a control cable extending in electrical communication between the illumination means and both the power switch and the dimmer switch.

2. The lawnmower headlight system of claim 1, wherein the illumination means comprises a light housing mounted to the engine of the lawnmower, the control cable extending through the light housing; and a dual-beam headlight mounted within the light housing, the headlight being electrically coupled to the control cable.

3. A lawnmower headlight system comprising:

a lawnmower having an engine mounted thereon and a handle extending therefrom:

a generator means mechanically coupled to the engine of the lawnmower for generating electrical power in response to the rotation of a shaft of said engine, said generator means comprising an upper housing member and a lower housing member, the housing members including apertures directed therethrough permitting a projection of said engine shaft of the engine through the housing members; a rotor mounted within and between the housing members; and a stator mounted within the housing members and positioned adjacent to the rotor, the stator being positioned in electrical communication with an illumination means mounted to the engine of the lawnmower by a power cable extending from the generator means to the illumination means, through a control switch the rotor including permanent magnets such that a rotation of the rotor will generate an induced current in the stator, thereby generating power for use by the illumination means; said said control switch being mounted to the handle of the lawnmower, wherein the control switch comprises a switch housing having a power switch and a dimmer switch mounted thereto the switch housing being shaped so as to define a handle bore directed therethrough, with a portion of tile handle being positioned through the handle bore of the switch housing, the power switch and the dimmer switch being electrically coupled to the power cable; and further comprising a control cable extending in electrical communication between the illumination means and both the power switch and the dimmer switch.

4. The lawnmower headlight system of claim 3, wherein the illumination means comprises a light housing mounted to the engine of the lawnmower, the control wire extending through the light housing; and a dual-beam headlight mounted within the light housing, the headlight being electrically coupled to the control wire.

* * * * *